June 10, 1941.  J. T. UDEN  2,245,370
CAMERA
Filed June 17, 1940
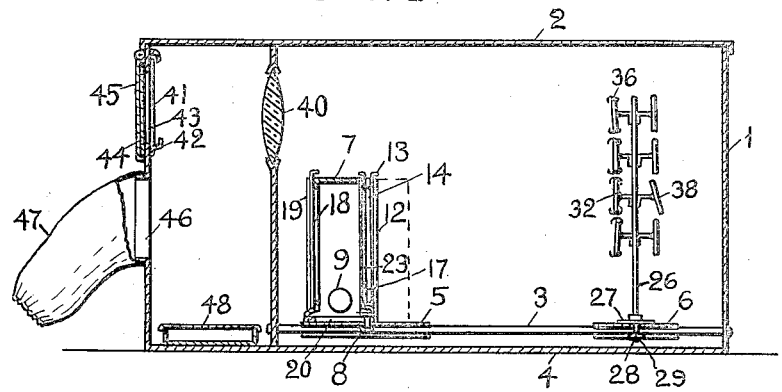
Fig. 1
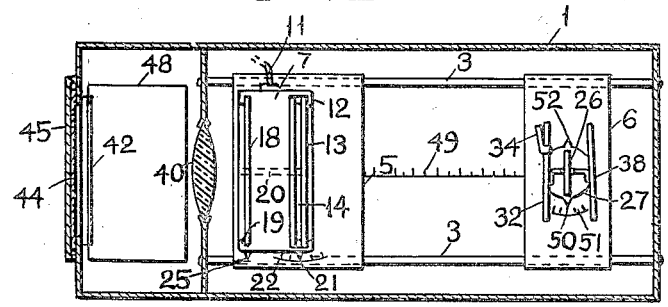
Fig. 2
Fig. 3
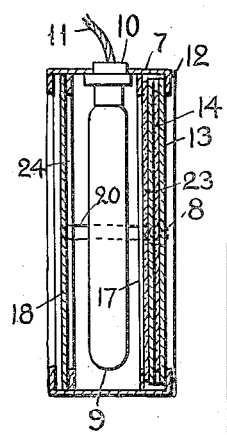
Fig. 4
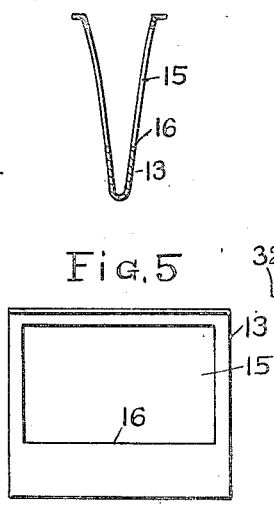
Fig. 6
Fig. 5
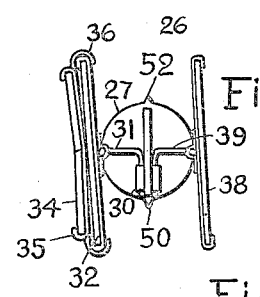
Fig. 7
JACOB T. UDEN
INVENTOR.
BY John P. Nilsonow
ATTORNEY.

Patented June 10, 1941

2,245,370

UNITED STATES PATENT OFFICE 2,245,370

CAMERA

Jacob T. Uden, New York, N. Y.

Application June 17, 1940, Serial No. 340,879

10 Claims. (Cl. 88—24)

My invention relates to cameras and has particular reference to cameras for printing from negatives or positives on a light-sensitive paper.

In my U. S. patent application Serial No. 287,227, filed July 29, 1939, I have disclosed a camera with adjustable mirrors for producing such multiple views of an original image on a negative.

The object of my present invention is to provide a camera which can be used for reproducing images either from negatives or from positives, a special projector being provided for this purpose, one side of the projector having a transparent glass for negatives, the other side having a flat reflector with a side opening for placing positives in front of the reflector for projecting through mirrors on a piece of light-sensitive paper. The projector can revolve on a central pivot and can be also shifted on the pivot to the front or to the rear, depending on whether a negative or positive is being used.

Another object of my invention is to provide means to reproduce not only multiple images but also images partly distorted or mutilated. I provide for this purpose two or more sets of mirrors mounted on a rotatable post, one set being for multiple images and the other or others for fractional or mutilated images. This effect is obtained by providing the mirrors with additional small mirrors adjustable in relation to the main mirrors.

My invention is more fully described in the accompanying specification and drawing in which:

Fig. 1 is a sectional elevational view of my camera;

Fig. 2 is a top plan view of the same with the cover removed;

Fig. 3 is a top plan view of a projector partly in section;

Fig. 4 is an end view of a cassette;

Fig. 5 is a side view of the same;

Fig. 6 is an end view of a mirror; and

Fig. 7 is a top plan view of the same.

My camera consists of an elongated box or casing 1 with a removable top cover 2. A pair of rails 3 are mounted in the casing at an elevation above the bottom board 4, supporting sliding carriages 5 and 6. The rear carriage 5 mounts a projector 7 on a central pivot 8, so that it can be turned to one side or to the other for distorting images being projected. The projector represents a box closed at the sides and at the top and bottom and having front and rear sides open, with a special narrow and long electric lamp 9 at the bottom fitted in a socket 10. A cord 11 extends from the socket and can be connected with a source of electric current.

The projector casing has inwardly bent side extensions 12 at the front for guiding and supporting a cassette 13, shown separately in Figs. 4 and 5, holding a negative 14. The cassette has openings 15 at the front and at the rear and a raised lower portion 16 corresponding to a reflecting plate 17 at the bottom of the projector casing. The plate 17 reflects the light to the rear of the projector on a flat reflecting plate 18 slidably supported between rear guiding extensions 19. The pivoting bolt 8 is slidably fitted in a slot 20 in the bottom plate of the projector, so that the latter can be moved forward when the negative 14 is placed at the front of the projector, so that the axis of rotation will pass through the negative. The latter will not be therefore displaced to the right or to the left when rotated as would be the case if the axis of rotation was located at the rear of the negative plate. A pointer 21 on the projector indicates its angular position on a scale 22 provided on the carriage. A glass plate 23 may be placed at the side of the projector for protecting the negative from the heat of the lamp.

The projector can be also used for projecting images from positives. The cassette 13 is then removed and a positive, such as an ordinary photographic print 24, is placed at the rear in place of the reflector plate 18 or in front of it. The projector is moved forward on its pivot 8, so as to bring the axis of rotation into the plane of the positive. A second pointer 25 is provided on the box 7 for its new position.

The front carriage 6 mounts a post 26 having a base 27 frictionally rotating on a bolt 28 held by a nut 29 on the under side of the carriage. The post 26 represents a flat plate with clips 30 at the rear side frictionally supporting angular wire brackets 31. The outer ends of the brackets are frictionally held on the back sides of mirrors 32 by clips 33. The mirrors can be turned on the brackets to one side or the other and can be also turned up or down by rotating the ends of the brackets in the clips. The mirrors have additional small mirrors 34, mounted preferably in pairs at a small angle to each other, each pair being held in a metal frame 35. The frames have hooks 36 slidably fitted over the edges of the mirrors 32.

For changing the angular position of the small mirrors 34 in relation to the mirrors 32, the frames 35 are provided with tongues 37 extending at an angle rearward and bearing against the edges of the mirrors 32. The hooks 36 have a certain resiliency and play, so that the mirrors 34 can be more or less inclined by moving them longitudinally on the mirrors 32, causing the tongues 37 to slide over their edges. Similar mirrors 38 are mounted on brackets 39 at the other side of the post 26.

The images, reflected by the mirrors, are projected through a condenser lens 40 against a piece of light-sensitive paper 41 supported on a narrow shelf 42 at the rear of the box 1. An opening 43 is provided in the rear wall covered with a frosted glass plate 44 for observing the reflected image prior to placing the light-sensitive paper in its place. A hinged cover 45 is provided for the glass plate to protect the paper from the outside light.

For manipulating the paper 41 an opening 46 is provided in the rear wall of the camera box 1 with a sleeve 47 made of black cloth. The operator's hand can be inserted through the sleeve, the latter being held tight by an elastic band at the edge. An additional supply of paper can be held in a box 48 at the bottom of the camera 1 within reach of the operator's hand.

A scale 49 is provided on the bottom plate of the box 1 for indicating position of the carriages.

The main function of the mirrors 32 is to multiply the image projected from the negative or positive, as, for instance, producing a group of identical persons from a single picture. The small mirrors 34 produce an added effect of mutilating the images, as, for instance, showing torsos without heads or heads without torsos.

The base 27 is provided with a pointer 50 indicating its angular position on a scale 51. Another pointer 52 is provided diametrically opposite the pointer 50 for indicating the position when the post 26 is turned around, bringing the other set of mirrors against the projector.

It is understood that my camera may be further modified without departing from the spirit of the invention as set forth in the appended claims.

I claim as my invention:

1. A camera comprising an elongated box, a projector adjustably supported in the lower rear portion of the box, means to support a negative image at the front of the projector, means to support a positive image at the rear of the projector, an electric lamp at the bottom of the projector, means to support a piece of light-sensitive paper at the rear of the box above the projector, and a plurality of adjustably supported mirrors in the front portion of the box for reflecting a distorted and multiple image from the projector onto the paper.

2. A camera comprising an elongated box, a projector adjustably supported in the lower rear portion of the box, means to support a negative image at the front of the projector, means to support a positive image at the rear of the projector, an electric lamp at the bottom of the projector, means to support a piece of light-sensitive paper at the rear of the box above the projector, a plurality of adjustably supported mirrors in the front portion of the box for reflecting a distorted and multiple image from the projector onto the paper, and a pivot supporting the projector for rotation on a vertical axis, the projector being adapted to be moved horizontally on the pivot for selectively placing the axis of rotation substantially in the plane of the negative at the rear or in the plane of the positive in the rear of the projector.

3. A camera comprising an elongated box, rails extending longitudinally at the bottom of the box, a carriage movably supported on the rails at the rear end of the box, a projector in the form of a box open at the front and at the rear, means to support a negative at the front of the projector, means to support a positive at the rear of the projector, a reflector removably supported in place of the positive when the negative is supported at the front of the projector, an electric lamp at the bottom of the projector, the bottom wall of the projector having a transverse slot, a pivot attached to the carriage and engaging the slot, the projector being adapted to be rotated on the pivot, the position of the pivot in the slot being adjustable for selectively placing the axis of rotation in the plane of the negative or positive, means to support a piece of light-sensitive paper at the rear of the box above the projector, and a plurality of adjustably supported mirrors in the front portion of the box for reflecting a distorted and multiple image from the projector onto the paper.

4. A camera comprising an elongated box, rails extending longitudinally at the bottom of the box, a carriage movably supported on the rails at the rear end the box, a projector in the form of a box open at the front and at the rear, means to support a negative at the front of the projector, means to support a positive at the rear of the projector, a reflector removably supported in place of the positive when the negative is supported at the front of the projector, an electric lamp at the bottom of the projector, the bottom wall of the projector having a transverse slot, a pivot attached to the carriage and engaging the slot, the projector being adapted to be rotated on the pivot, the position of the pivot in the slot being adjustable for selectively placing the axis of rotation in the plane of the negative or positive, means to support a piece of light-sensitive paper at the rear of the box above the projector, a plurality of adjustably supported mirrors in the front portion of the box for reflecting a distorted and multiple image from the projector onto the paper, a pointer at the lower portion of the projector, and two separate arcuate scales on the carriage for indicating the degree of rotation separately for the front and rear position of the projector on the pivot.

5. A camera comprising an elongated box, a projector in the rear portion of the box adapted to project an image toward the front end of the box, means to support a piece of light-sensitive paper at the rear wall of the box above the projector, a plurality of mirrows adjustably supported in the front portion of the box, the mirrors being adapted to deflect the image onto the paper in a modified form, and supplementary small mirrors adjustably mounted on the first mirrors adapted to mutilate the image.

6. A camera comprising an elongated box, a projector in the rear portion of the box adapted to project an image toward the front end of the box, means to support a piece of light-sensitive paper at the rear wall of the box above the projector, a plurality of elongated rectangular mirrors, means in the front portion of the box to adjustably support the mirrors one above the other, the mirrors being adapted to deflect the image onto the paper in a modified form, and supplementary small mirrors slidably supported at the ends of the main mirrors adapted to mutilate the image.

7. A camera comprising an elongated box, a projector in the rear portion of the box adapted to project an image toward the front end of the box, means to support a piece of light-sensitive paper at the rear wall of the box above the projector, a plurality of elongated rectangular mirrors, means in the front portion of the box to adjustably support the mirrors one above the other, the mirrors being adapted to deflect the image onto the paper in a modified form, supplementary small mirrors slidably supported at the ends of the main mirrors adapted to mutilate the image, and means on the supplementary mirrors to change their angle relatively to the main mirrors.

8. A camera comprising an elongated box, a projector in the rear portion of the box adapted to project an image toward the front end of the box, means to support a piece of light-sensitive paper at the rear wall of the box above the projector, a plurality of elongated rectangular mirrors, means in the front portion of the box to adjustably support the mirrors one above the other, the mirrors being adapted to deflect the image onto the paper in a modified form, frames slidably supported on the end portions of the mirrors, supplementary mirrors mounted in the frames, and tongues extending from the ends of the frames at an angle thereto for changing the angle between the frames on the main mirrors when the frames are moved longitudinally on the main mirrors.

9. A camera comprising an elongated box, a projector adjustably supported in the lower rear portion of the box, means to support a negative image at the front of the projector, means to support a positive image at the rear of the projector, an electric lamp at the bottom of the projector, means to support a piece of light-sensitive paper at the rear of the box above the projector, a plurality of adjustably supported mirrors in the front portion of the box for reflecting a distorted and multiple image from the projector onto the paper, the rear wall of the box having an opening for the operator's hand, and a flexible sleeve extending from the opening for enclosing the operator's arm.

10. A camera comprising an elongated box, a projector adjustably supported in the lower rear portion of the box, means to support a negative image at the front of the projector, means to support a positive image at the rear of the projector, an electric lamp at the bottom of the projector, means to support a piece of light-sensitive paper at the rear of the box above the projector, a plurality of adjustably supported mirrors in the front portion of the box for reflecting a distorted and multiple image from the projector onto the paper, the rear wall of the projector having an opening back of the paper, a frosted glass covering the opening, and a cover for the glass.

JACOB T. UDEN.